UNITED STATES PATENT OFFICE.

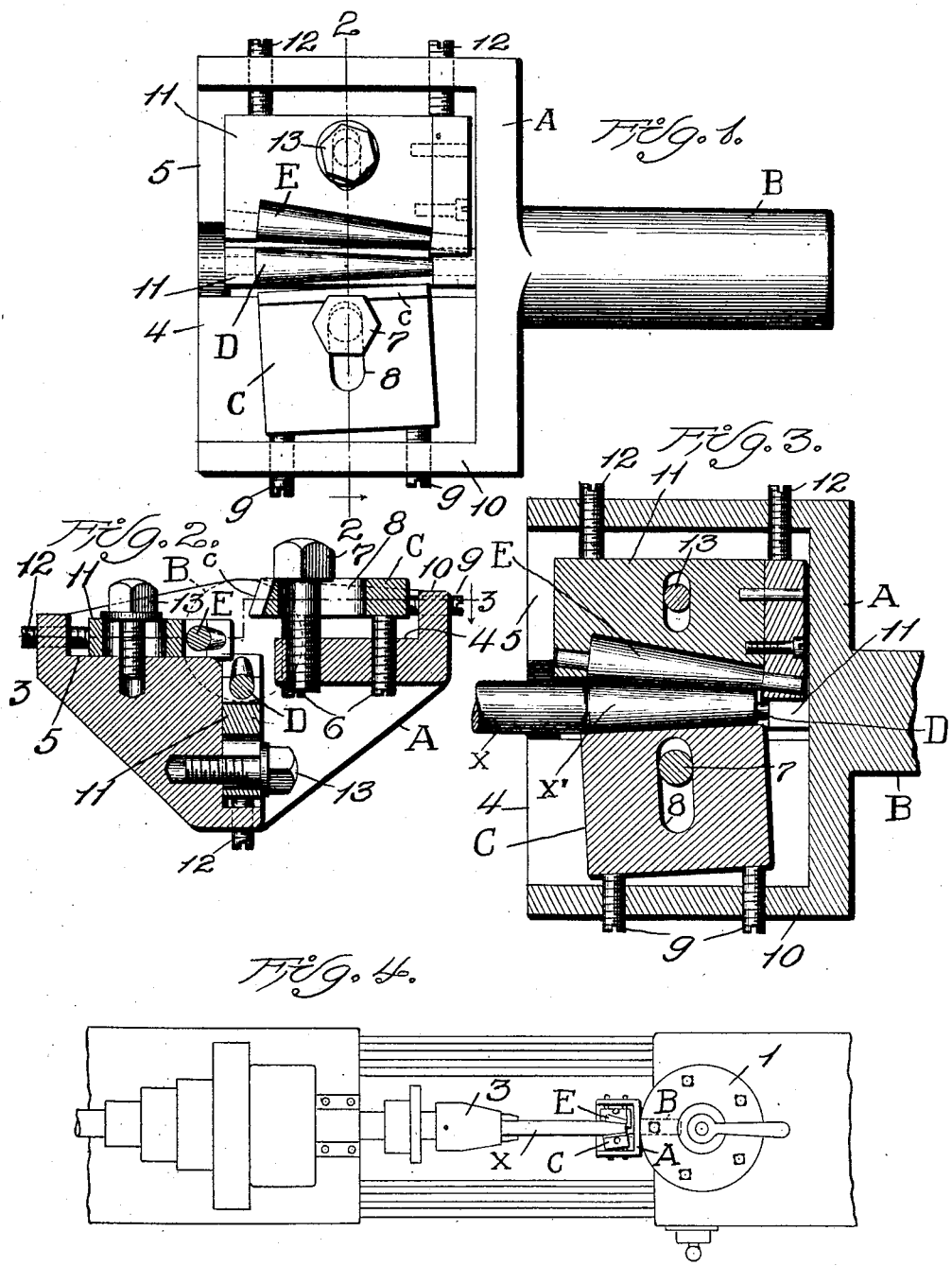
M. A. CULLING.
TAPER TURNING TOOL.
APPLICATION FILED SEPT. 12, 1918.
1,329,265.                                    Patented Jan. 27, 1920.
INVENTOR
MERRITT A. CULLING

MERRITT A. CULLING, OF LOUISIANA, MISSOURI, ASSIGNOR TO BUFFUM TOOL COMPANY, OF LOUISIANA, MISSOURI, A CORPORATION OF MISSOURI.

TAPER-TURNING TOOL.

1,329,265. Specification of Letters Patent. Patented Jan. 27, 1920.

Application filed September 12, 1918. Serial No. 253,686.

*To all whom it may concern:*

Be it known that I, MERRITT A. CULLING, a citizen of the United States, residing at Louisiana, Missouri, have invented a certain new and useful Improvement in Taper-Turning Tools, of which the following is a full, clear, and exact description, such as will enables others skilled in the art to which it appertains to make and use the same.

This invention relates to taper turning tools for screw machines.

One object of my invention is to provide a taper turning tool for screw machines in which the cutter is so arranged that it has a substantially shearing action on the work instead of a scraping action, thereby improving the cutting effect of the tool, reducing the tendency of the cutter to become dull and materially increasing the output of the tool, due to the increase in speed of the cutting operation.

Another object is to provide a taper turning tool for lathes and screw machines which is equipped with a roller for supporting the portion of the work on which the cutter acts, thereby preventing the cuttings from balling up and making a rough surface on the finished taper formed on the work.

Figure 1 of the drawings is a top plan view of a taper turning tool constructed in accordance with my invention.

Fig. 2 is a vertical sectional view of same, taken on the line 2—2 of Fig. 1.

Fig. 3 is a horizontal sectional view of the tool, taken on the line 3—3 of Fig. 2; and Fig. 4 is a top plan view of a screw machine or lathe equipped with my improved taper turning tool.

Referring to the drawings which illustrate the preferred form of my invention. A designates the head or body portion of the tool, and B designates the shank on said body portion which is adapted to be inserted in the tool holder 1 of the machine on which the tool is used, the work $x$ being carried by a rotatable part 3 of said machine which rotates the work at a high speed.

The cutter C of my improved taper turning tool is mounted on the body portion A in such a manner that the cutting edge $c$ of said cutter is disposed above the taper $x'$ being formed on the work. By arranging the cutter in this manner I obtain a substantially shearing cut on the work and I also obtain a greater clearance for the cutting edge of the cutter. Consequently, the cutter will have a more perfect cutting action on the work and it will stay sharp longer than a taper turning tool in which the cutter has a scraping action on the work, due to the increased clearance for the cutting edge of the cutter. Instead of supporting the end portion of the work by a stationary work rest, as has heretofore been the usual practice in taper turning tools for screw machines, I have provided my improved tool with rollers D and E that contact with the portion of the work on which the taper is being formed. Consequently, I reduce the tendency for the cuttings to ball up and form a rough surface on the taper that is being formed on the work.

In the form of my invention herein shown the head or body portion A of the tool consists of a block of metal provided on its top side with two horizontally-disposed surfaces 4 and 5 that are arranged on opposite sides of a groove or slot in said head in which the work supporting roller D is arranged. The cutter C is arranged horizontally above the surface 4 on the head in parallel relation to same, so as to cause the cutting edge $c$ of said cutter to be positioned at the top side of the taper $x'$ formed on the work. Said cutter is preferably mounted in such a manner that it can be adjusted vertically so as to raise and lower the cutting edge of same and also adjusted angularly with relation to the axis of rotation of the work $x$ so as to vary the angle of the taper formed on the work. Any suitable means can be used for adjusting the cutter C and locking it securely in adjusted position, but I prefer to provide the head A of the tool with a plurality of vertically-disposed screws 6 that serve as a support for the cutter, said cutter being securely clamped against the upper ends of said screws by means of a clamping bolt 7 adjustably mounted in the head of the tool and passing through an elongated slot 8 in the cutter. Adjusting screws 9 are provided for accurately adjusting the cutter C so as to change the angular position of the cutting edge of same, said adjusting screws being mounted in a flange 10 on the head of the tool and arranged so that they bear against the rear edge of the cutter C.

During the cutting operation the end portion of the work on which the taper $x'$ is being formed is supported by the two rollers D and E previously mentioned, the roller D being arranged below the portion of the work on which the cutter is acting, and the roller E being arranged at one side of the portion of the work on which the cutter is acting, preferably at a point below the cutting edge of said cutter, as shown more clearly in Fig. 2 of the drawings. Said rollers are substantially cone-shaped or tapered longitudinally and they are mounted in the head A of the tool in such a manner that the taper $x'$ formed on the work by the cutter C will bear firmly against both of said rollers during the cutting operation, thereby eliminating the possibility of the work springing away from the cutter. As shown in Fig. 2 of the drawings, the roller D is inclined upwardly from its outer toward its inner end, so that the large outer end of said roller will be positioned farther away from the cutting edge of the cutter than the small inner end of said roller. The roller E is inclined horizontally at such an angle with relation to the axis of rotation of the work $x$ that the small inner end of said roller will be positioned closer to the cutting edge of the cutter than the large outer end of said roller. In other words, the rollers D and E present the same angle to the work as the cutting edge $c$ of the cutter, but are disposed oppositely to said cutting edge so as to provide a true roller bearing surface for the portion $x'$ of the work on which the cutter acts. Said work supporting rollers are mounted in the head in such a manner that they can be adjusted so as to vary the angular position of same, and while this can be effected in various ways, I prefer to mount each of said rollers in a carrier 11 that can be adjusted accurately by adjusting screws 12 and thereafter locked securely in adjusted position by means of a clamping bolt 13.

Having thus described my invention, what I claim and desire to secure by Letters Patent is:

1. A taper turning tool for screw machines, comprising a head, a cutter arranged on said head in such a manner that the cutting edge of same will act on the top side of the work, and means for enabling said cutter to be adjusted so as to raise and lower the cutting edge of same and also change the angular position of the cutting edge with relation to the axis of rotation of the work.

2. A taper turning tool for screw machines, comprising a head, vertically-adjustable devices on said head, a horizontally-disposed cutter supported by said devices, and means for clamping the cutter against said devices.

3. A taper turning tool for screw machines, comprising a head, vertically-adjustable devices on said head, a horizontally-disposed cutter supported by said devices, means for clamping the cutter against said devices, and adjusting screws mounted in the head and arranged so that they will engage the rear edge of the cutter and thus enable the angular position of the cutting edge of the cutter to be varied by manipulating said screws.

4. A taper turning tool for screw machines provided with a substantially cone-shaped roller that contacts with the portion of the work on which the taper is being formed.

5. A taper turning tool for screw machines, comprising a head, a cutter on said head whose cutting edge extends at an angle with relation to the axis of the work, and a plurality of substantially cone-shaped work supporting rollers mounted on said head in such a manner that they provide a roller bearing surface for the portion of the work on which the taper is being formed.

6. A taper turning tool for screw machines, comprising a head, a horizontally-disposed cutter mounted on said head in such a manner that the cutting edge of same is positioned at the top side of the work, and a plurality of longitudinally tapered or cone-shaped work supporting rollers mounted on the head and extending longitudinally of the work, one of said rollers being positioned below the work and the other at one side of the work.

7. A taper turning tool for screw machines, comprising a head, a horizontally-disposed cutter mounted on said head in such a manner that the cutting edge of same is positioned at the top side of the work, a plurality of longitudinally tapered or cone-shaped work supporting rollers mounted on the head and extending longitudinally of the work, one of said rollers being positioned below the work and the other at one side of the work, and means for enabling said work supporting rollers to be adjusted so as to insure a true rolling contact between the work and said rollers.

8. A taper turning tool for screw machines, comprising a head, a cutter on said head whose cutting edge is positioned above and at the top side of the work, means for enabling said cutter to be adjusted, and a plurality of substantially cone-shaped work supporting rollers arranged on said head in proximity to said cutter, each of said rollers being mounted in a roll carrier, means for adjusting said roll carriers, and means for clamping said roll carriers in adjusted position.

MERRITT A. CULLING.